Patented Apr. 8, 1952

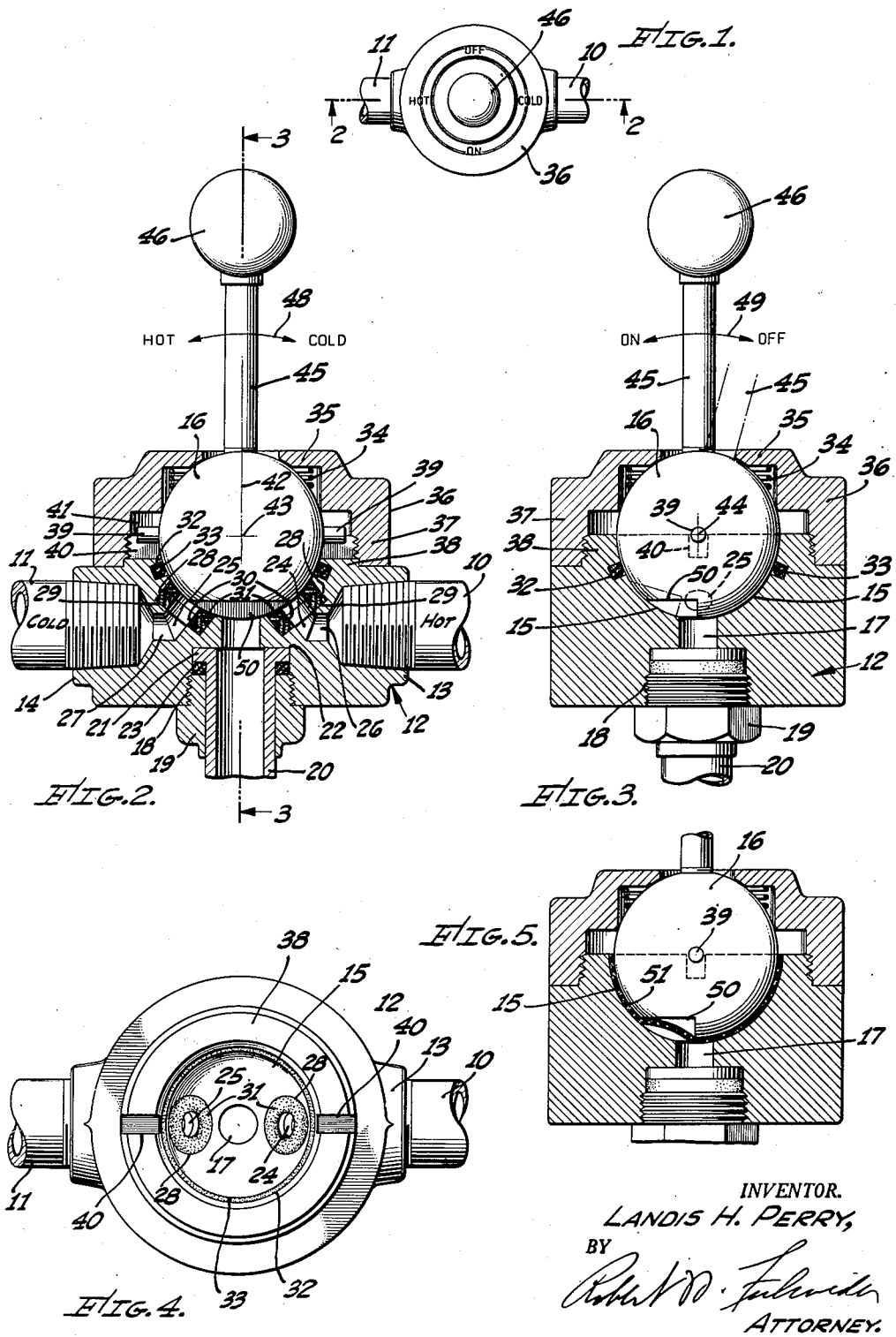

2,592,062

UNITED STATES PATENT OFFICE 2,592,062

MIXING VALVE

Landis H. Perry, Glendale, Calif.

Application August 21, 1945, Serial No. 611,836

9 Claims. (Cl. 251—106)

This invention relates to valves and has as its general object to provide an improved valve which combines the functions of mixing two separate streams of fluid in a blended discharge and controlling the quantity of discharge from a full flow to a completely shut off condition. The invention is particularly useful as embodied in a hot and cold water faucet.

An object of the invention is to provide a valve having a single control member having universal pivotal movement and adapted when moved between one set of opposed positions to control the blending of the fluids and when moved between another set of opposed positions, to control the quantity of flow. Another object is to provide such a valve in which the control member may assume any one of an infinite number of positions lying either in or intermediate the planes of movement between the aforesaid opposed positions, in order that any desired combination of blending and quantity of flow may be attained.

A further object is to provide a valve which may be operated to determine the degree of blending between two separate fluid streams before the flow from the valve is started, or can be operated to vary the blending without changing the volume of flow.

Attempts in the past to provide a combined mixing valve and volume control valve have resulted in rather complicated and impractical structures. A particularly difficult problem in such development has been the problem of sealing a universally movable valve element with reference to the several flow parts with which it must cooperate. One of the objects of my invention is to provide a combined volume and blending control valve having relatively simple and yet effective means for sealing the valve element with reference to the flow parts. A further object is to provide an arrangement which permits replacement of the sealing means with a minimum of difficulty. In fact, the invention makes it possible to replace worn sealing gaskets just as easily as in the conventional single flow faucet.

A further object of the invention is to provide a valve having sealing means that will not leak. This has been a particularly difficult problem in this type of valve, and the invention solves the problem in a relatively simple yet extremely effective manner.

Finally, it is an important object of the invention to provide a valve which, in addition to the above characteristics is simple, easily constructed, readily taken apart for repair or replacement of parts, and extremely sturdy and durable.

Other objects of the invention will become apparent from the following specification, in connection with the appended drawings, in which:

Figure 1 is a plan view of a faucet valve embodying my invention;

Figure 2 is a vertical sectional view of the same taken on the line 2—2 of Fig. 1;

Figure 3 is a vertical sectional view of the valve taken on the line 3—3 of Fig. 2;

Figure 4 is a plan view of the main body portion of the valve and including valve seats; and Figure 5 is a vertical sectional view of a valve embodying a modified form of the invention.

As an example of one form in which the invention may be embodied, I have shown in Figs. 1 to 4 inclusive a valve adapted to control the blending and volume of flow of streams of hot and cold water from hot and cold water pipes 10 and 11 respectively. The valve includes a main valve body 12 having internally threaded bosses 13 and 14 respectively into which the pipes 10 and 11 are threaded. The valve body has a semi-spherical socket 15 adapted to receive the lower half of a spherical ball valve element 16. The socket 15 is located centrally of the body 12 and is connected to an outlet port 17 which is coaxial with the center of generation of the spherical surface of the socket 15. The body 12 has a threaded opening 18, concentric with the port 17, into which is threaded a nut 19 that serves to attach to the body 12 an outlet nozzle 20. The nozzle 20 has at its inner end a flange 21 which is clamped against a shoulder 22 defined between the port 17 and the threaded opening 18. A gasket 23 forms a seal between the flange 21 and the nut 19.

The body 12 is provided with hot and cold water ports 24 and 25 respectively, each disposed radially with reference to the center of generation of the spherical socket 15 and therefore normal to the spherical surface. Aligned connecting passages 26 and 27 join the ports 24 and 25 to the pipes 10 and 11 respectively. Each of the ports 24 and 25 communicates with a counterbore 28, the bottom of which forms a shoulder 29. Seated against the shoulder 29 in each counterbore 28 is a compressible washer 30, and seated against each washer 30, in a respective counterbore 28, is an annular valve seat 31 having a spherical seating surface.

The body 12 has an annular groove 32 encircling the socket 15, coaxial with the axis of the outlet port 17, and opening radially inwardly into the spherical surface of the socket 15. In the groove 32 is seated an O-ring 33 (a ring of compressible material such as rubber or synthetic rubber, round in cross section). The spherical valve element 16 is seated in the socket 15, in sealing engagement with the seating surfaces of the valve seat rings 31 and in sealing engagement with the O-ring 33. The valve element 16 is maintained in such sealing engagement by a coil spring 34 which is engaged under compression between the surface of the valve element and a flange 35 of a cap 36. The cap 36 has an internally threaded flange 37 which is threaded onto an externally threaded collar 38 on the body 12, concentric with the axis of the port 17. This axis will hereinafter be referred to as the main axis of the valve, and by the numeral 42.

The valve element 16 is provided with diametrically opposed trunnions 39, which are confined within diametrically opposed recesses defined cooperatingly by notches 40 and 41 respectively in the collar 38 and cap 36. The recesses 40, 41 confine the trunnions 39 in such a manner as to prevent rotation of the valve element 16 about the main axis 42. However, the recesses 40, 41 have sufficient depth in the direction parallel to the axis 42 to permit oscillation of the valve element 16 about an axis extending at right angles to the axis 42 and at right angles to the general plane of the recesses 40, 41. Such axis is indicated in Fig. 2 at 43. Also, the trunnions 39 may rotate in the recesses 40, 41 so as to permit the valve element 16 to oscillate about an axis that is at right angles to the axis 42 and lies in the general plane of the recesses 40, 41. This axis is indicated at 44 in Fig. 3.

Secured to and extending from one side of the valve element 16 is an operating lever 45 having at its outer end a knob 46 which is preferably of spherical form to facilitate the universal movement of the lever 45. Movement of the valve element 16 about the axis 43 is effected by moving the lever as indicated by the arrow 48 in Fig. 2. Movement of the valve element 16 about the axis 44 is effected by moving the lever 45 as indicated by the double arrow 49 in Fig. 3.

The valve element 16 may simply be a solid sphere, provided with a recess or notch 50 in a side opposite the lever 45. The notch 50 extends from side to side of the valve element 16 in a direction parallel to the axis 44, but extends only on one side of the common plane of the axes 44 and the lever 45. Consequently, by shifting the valve element about the axis 44 from the neutral position shown, toward the "off" position as indicated on the drawing, the notch 50 may be shifted completely out of communication with the ports 17, 24 and 25, whereas by shifting the lever 45 in the "on" direction about the axis 44, a greater area of notch 50 will be exposed to the ports 17, 24 and 25 than in the neutral position.

It may be noted at this point that in the position referred to above as the neutral position, the valve element will permit a moderate flow of water, blended equally from the hot and cold streams, to the outlet port 17. By moving the lever 45 in the "on" or "off" direction while maintaining it in the common plane of the axes 42 and 43, the volume may be increased or decreased without changing the blending ratio.

It will be seen that in the neutral position of the valve element, each end of the notch 50 is in partial communication with a respective port 24, 25. When the valve element is oscillated about the axis 43, in the "hot" direction, as predicted by the arrow in Fig. 2, one end of the notch 50 will increase its area of communication with the port 26, while the other end decreases its communication with the port 27. Consequently, the flow of hot water will be increased while the flow of cold water is decreased. Conversely, movement in the "cold" direction will increase the communication with the port 27 and decrease the communication with the port 26, thereby increasing the flow of cold water and decreasing the flow of hot water. This change in the blending of the hot and cold streams may be effected irrespective of the degree of oscillation of the valve element 16 about the axis 44. It will therefore be apparent that any desired quantity of flow of the blended stream of water of any proportion of blending may be obtained.

When the lever 45 is moved entirely to the "off" position, the notch 50 is separated from communication with the ports 26 and 27. Thus a complete sealing takes place between the spherical surface of the valve element 16 and the spherical seating surfaces of the inlet valve seat rings 31, thereby obviating the need of any sealing means at the outlet port. This will be apparent from an inspection of the dotted line position of the notch 50 shown in Fig. 3, and the relation thereof to the ports 24 and 25 the bottom of which is also shown in dotted lines.

The resilient washers 30 yieldingly maintain the valve seat rings 31 in snug engagement with the surface of the valve element 16. The seat rings 31 may be of a phenolic resin material which takes a high polish and maintains an extremely close fit with the member to which it is fitted, throughout countless movements thereof. The valve element 16 itself may be solid brass or plated steel, or may be of plastic or other suitable material.

The O-ring 33 seals the valve against the escape of liquid upwardly through the cap 36.

In the form of the invention shown in Fig. 5, the valve seat rings 31 and resilient washers 30 may be dispensed with. Instead, a flexible lining 51 of rubber or a similar material is interposed between the valve element 16 and the socket 15, and the pressure of the water will move the liner 51 out of contact with th spherical surface of the socket 15 into the notch 50 in order that the water may find a pathway from a port 24 or 25 to the port 17.

The liner 51 is preferably bounded to the surface of the socket 15 and all the areas thereof except those areas that may be associated with the notch 50, and has a smooth inner surface which will permit the surface of the valve element 16 to slide thereon. Alternatively, the central region of the liner 51 may be bonded to the surface of the valve element 16 around the periphery of the notch 50 and the marginal region of the liner 51 may be bonded to the marginal region of the socket 15. Sufficient spacing between the valve element 16 and the socket 15 may then be provided to permit free movement of the central portion of the liner 51, which, being bonded to the valve 16, may then stretch sufficiently to permit the requisite valve movement.

While the particular apparatus herein shown and described in detail is fully capable of attaining the objects and providing the advantages hereinbefore stated, it is to be understood that it is merely illustrative of the presently preferred embodiment of my invention, and that I do not mean to limit myself to the details of construction or design herein shown, other than as defined in the appended claims.

I claim:

1. A valve comprising: a valve body having a general semi-spherical socket and a pair of inlets and an outlet port all opening into said socket, with the inlet ports arranged in a common diametral plane and the outlet port centered between said inlet ports; and a spherical valve element universally pivotal in said socket and having a single recess extending from side to side thereof in one direction and from an equatorial plane thereof to only one side thereof in a direction at right angles to said one direction, said recess being adapted to communicate with said inlet ports at its respective ends, and with said outlet port intermediate its ends, and being adapted to vary its ratio of communication with the respective inlet ports as the result of oscillation of the valve element about an axis perpendicular to said recess and to vary the degree of communication of said inlet ports with said outlet port as the result of oscillation about an axis at right angles to said one axis.

2. A valve comprising: a valve body having a socket and a pair of inlet ports and an outlet port opening into said socket, and having a pair of counterbores coaxial with and communicating with said inlet ports; a pair of annular valve seats received in the respective counterbores; washers of compressible elastic material interposed between said valve seats and the bottoms of said counterbores; a valve element having a spherical surface received in said socket and against which said valve seats are yieldingly urged by said compressible washers, said valve element having recess means for simultaneously establishing communication between both the said inlet ports and said outlet port; and means restricting said valve element to movement about one axis and about an axis perpendicular thereto.

3. A valve comprising: a valve body having a socket and a pair of inlet ports and an outlet port opening into said socket, said valve body also having an annular groove coaxial with and encircling said socket between said inlet ports and the margin thereof; a valve element having a spherical surface received in said socket and a depression cooperating with both said inlet ports and said outlet port for simultaneously establishing variable communication therebetween; sealing members surrounding said inlet ports, mounted in said valve body and bearing against said valve element; an O-ring seating in said annular grove in sealing engagement with the spherical surface of said valve element; resilient means urging said valve body into said socket to provide, with said sealing members, a fluid seal therebetween; and means limiting said valve element to movement about two perpendicular axes.

4. A valve comprising: a valve body having a socket and a pair of inlet ports and an outlet port therein communicating with said socket; said valve body having a threaded collar forming the rim of said socket and a pair of diametrically opposed notches in said collar; a valve element of spherical form seated in said socket and having passage means for connecting said outlet port in varying ratio of communication with the inlet ports when moved about one axis and in varying degree of communication therewith when moved about a perpendicular axis; a cap threaded upon said threaded collar and operating to urge said valve element into seating relation in said socket, said cap having a notch registering with the notches in said collar and cooperating therewith to define a pair of recesses diametrically opposed on opposite sides of the axis of said socket; and a pair of trunnions mounted in diametrically opposed relation in said valve element and engaged in said notches of both collar and cap to prevent rotation of said valve element about said socket axis but permitting oscillation of said valve element about the axis of said trunnions and about an axis at right angles to the axis of said trunnions.

5. A valve comprising: a valve body having a hemi-spherical socket therein and a pair of inlet ports and an outlet port all communicating with said socket; a liner of resilient material and of hemi-spherical form in said socket; and a valve element having a spherical surface received within said liner and having a recess adapted to permit a portion of said liner to yield away from said ports so as to establish communication between said inlet ports and said outlet port.

6. A valve comprising: a valve body having a socket and an inlet and an outlet port communicating with said socket; a liner of relatively thin yielding sheet material in said socket, extending over said ports but adapted to yield away from said ports to establish communication between them; and a valve element having a surface conforming to the shape of said socket and provided with a recess to accommodate the yielding of said liner away from said ports.

7. A valve which includes: a valve body having a socket and a pair of inlet ports and an outlet port therein communicating with said socket; a valve element of spherical form seated in said socket and having passage means for establishing communication between the respective inlet ports when moved about one axis and said outlet port when moved about a perpendicular axis in varying ratio of communication with the inlet ports and varying degree of communication with the outlet port; resilient means urging said valve element against said socket to effect a seal therebetween adjacent said ports; means limiting the movement of said valve element to rotation about two perpendicular axes; and means attached to said valve element to control the position thereof.

8. A valve which includes: a housing having a socket and a pair of inlet ports and an outlet port connecting to said socket; a generally spherical valve body mounted within said socket for rotation therein and having passage means for establishing communication between the respective inlet ports and said outlet port in varying ratio of communication with the inlet ports when moved about one axis and varying degree of communication with the outlet port when moved about a perpendicular axis; resilient means urging said valve body against said socket; annular sealing members between said valve body and said socket, establishing a fluid seal therebetween at least around said ports; means limiting the movement of said valve body to rotation about said two perpendicular axes; and means attached to said valve body to control the position thereof.

9. A valve which includes: a housing having a socket and a pair of inlet ports and an outlet port connecting to said socket; a generally spherical valve body mounted within said socket for rotation therein and having passage means for connecting said outlet port in varying ratio of communication with the inlet ports when moved about one axis, and in varying degree of communication therewith when moved about a perpendicular axis; annular sealing members between said valve body and said socket, establishing a fluid seal therebetween at least around said ports; means limiting the movement of said valve body to rotation about said two perpendicular axes; and means attached to said valve body to control the position thereof.

LANDIS H. PERRY.

REFERENCES CITED

The following references are of record in the file of this patent:

UNITED STATES PATENTS

| Number | Name | Date |
|---|---|---|
| 1,478,688 | Whidden | Dec. 25, 1923 |
| 1,555,948 | Engel | Oct. 6, 1925 |
| 1,614,437 | Cochran | Jan. 11, 1927 |
| 1,661,431 | Leibing | Mar. 6, 1928 |
| 1,677,242 | Larrigan | July 17, 1928 |
| 1,945,646 | Kumpman et al. | Feb. 6, 1934 |
| 2,020,286 | Bittle | Nov. 12, 1935 |
| 2,337,321 | Freeman | Dec. 21, 1943 |